M. J. BARROW.
Saw-Clamp.

No. 220,694. Patented Oct. 21, 1879.

WITNESSES
Saml R Turner
J B Holderby

INVENTOR
Marion J Barrow
By R S & A P Lacey
ATTORNEYS

N. PETERS, PHOTO-LITHOGRAPHER, WASHINGTON, D C.

UNITED STATES PATENT OFFICE.

MARION J. BARROW, OF ROOD HOUSE, ILLINOIS.

IMPROVEMENT IN SAW-CLAMPS.

Specification forming part of Letters Patent No. 220,694, dated October 21, 1879; application filed May 16, 1879.

*To all whom it may concern:*

Be it known that I, MARION JASPER BARROW, of Rood House, in the county of Greene and State of Illinois, have invented certain new and useful Improvements in Saw-Clamps; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has for its object to provide a substantial and cheap saw-clamp.

It consists in a pair of jaws hinged together by a pair of clamps at their ends, so that they will have a parallel movement, and so that the blade of the saw will be grasped and held with the teeth projecting above, where they may be readily got hold of by the saw-set, or sharpened by the file.

Figure 1:
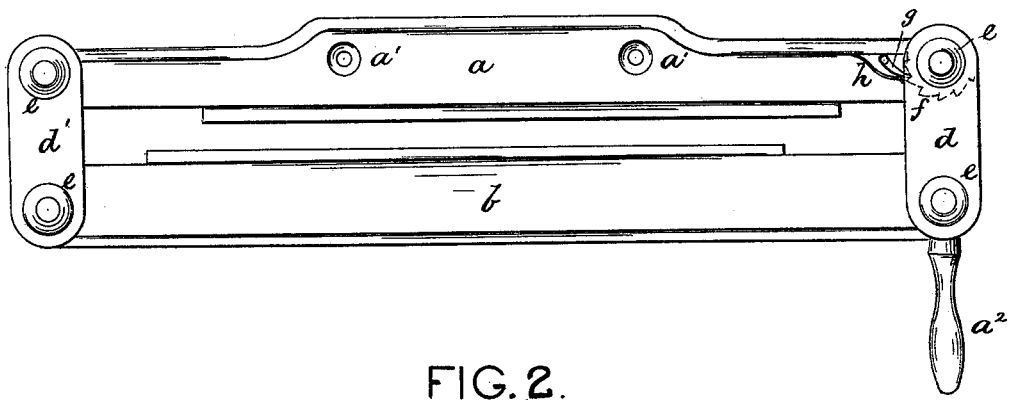
Figure 2:
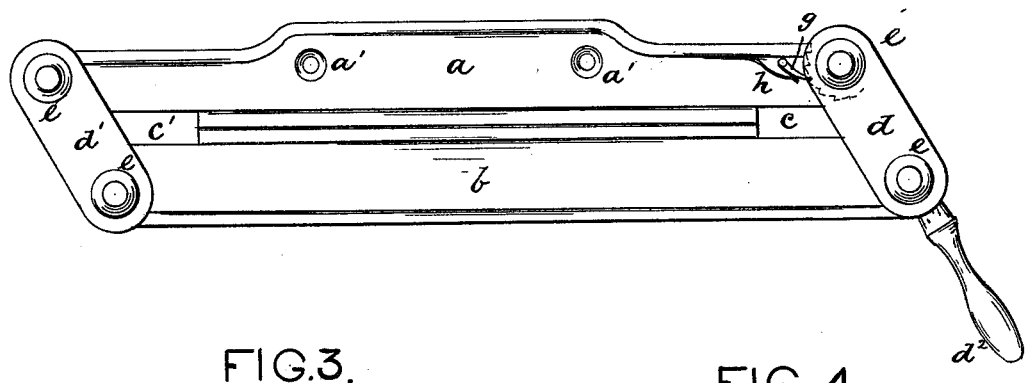
Figure 3:
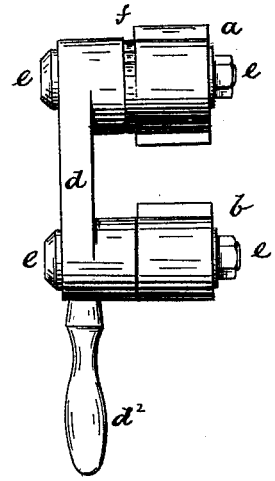
Figure 4:
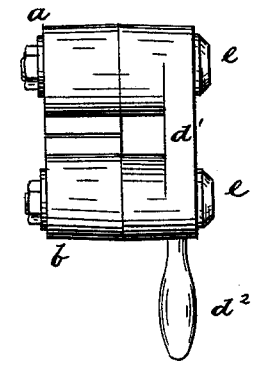

In the drawings, Figure 1 is a plan of the clamp with the jaws open. Fig. 2 is a plan with the jaws closed, and Figs. 3 and 4 are elevations of opposite ends.

$a$ is the fixed jaw, which is provided with bolt-holes $a'$ $a'$, by which it can be secured to the work-bench or other suitable place. $b$ is the movable jaw, hinged to the jaw $a$ so that it shuts close against, and when opened moves parallel to, the latter. Both jaws are cut away on their inner edges at the ends under the clamps, as shown, so as to provide wide spaces $c$ $c'$ between them when closed, so that the handle of the saw can rest therein when the blade is held by the clamp.

$d$ $d^1$ are two clamping-bars constructed with feet $d^2$, which elevate them above the upper sides of the jaws $a$ and $b$, so that the saw blade and handle may be inserted and properly adjusted for setting and sharpening. The clamps are secured by bolts $e$ $e$ to the ends, and on the upper side of the jaws and parallel with each other, so that the jaw $b$ may be opened or closed against the jaw $a$ by pulling on the handle $d^2$ attached to the clamp $d$.

If the bolts $e$ are kept properly tightened, the jaws, when brought together, will hold the saw-blade without the assistance of locking mechanism. The clamps are arranged to cross the jaws when the latter are closed at an angle of forty-five or more degrees, from which angle they cannot be forced by any ordinary movement in setting or sharpening the teeth of the saw.

To avoid any accidental opening of the jaws I construct one of the feet of one clamp with a series of ratchet-teeth, $f$, which are engaged by a pawl, $g$, secured to jaw $a$, and held by a spring, $h$. The pawl can be lifted from its hold in the teeth by the finger of the same hand that operates the lever $d^2$ in opening the jaws.

This device is simple in construction, efficient in operation, and cheap in its manufacture.

Having described my invention, I claim—

The improved saw-clamp composed of the jaws $a$ and $b$ and the clamps $d$ $d^1$, constructed with feet to elevate them above the jaws, and secured to the latter and parallel with each other, and arranged to operate substantially as and for the purpose set forth.

In testimony that I claim the foregoing as my own I herewith affix my signature in presence of two witnesses.

MARION JASPER BARROW.

Witnesses:
A. W. BARROW,
N. L. MARTIN.